United States Patent
Roy Chowdhury et al.

(10) Patent No.: US 12,504,483 B2
(45) Date of Patent: Dec. 23, 2025

(54) METHOD FOR AGEING ANALYSIS OF MIXED ELECTRODE LITHIUM ION CELL

(71) Applicant: VOLVO TRUCK CORPORATION, Gothenburg (SE)

(72) Inventors: Niladri Roy Chowdhury, Hisings Backa (SE); Gustav Giske, Johanneshov (SE); Istaq Ahmed, Gothenburg (SE); Martin Petisme, Gothenburg (SE); Carl-Robert Florén, Gothenburg (SE); Alice Hamrin, Gothenburg (SE); Masood Tamadondar, Mölndal (SE); Praveen Raju Hasbavi, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 175 days.

(21) Appl. No.: 18/467,275

(22) Filed: Sep. 14, 2023

(65) Prior Publication Data
US 2024/0103092 A1    Mar. 28, 2024

(30) Foreign Application Priority Data
Sep. 28, 2022 (EP) .................................... 22198389

(51) Int. Cl.
| | |
|---|---|
| *G01R 31/392* | (2019.01) |
| *G01R 31/3842* | (2019.01) |
| *H01M 10/0525* | (2010.01) |
| *H01M 10/48* | (2006.01) |
| *B60L 58/00* | (2019.01) |
| *B60R 16/033* | (2006.01) |

(52) U.S. Cl.
CPC ....... *G01R 31/392* (2019.01); *G01R 31/3842* (2019.01); *H01M 10/0525* (2013.01); *H01M 10/48* (2013.01); *B60L 58/00* (2019.02); *B60R 16/033* (2013.01)

(58) Field of Classification Search
None
See application file for complete search history.

(56) References Cited

U.S. PATENT DOCUMENTS

| | | |
|---|---|---|
| 10,908,219 B2 | 2/2021 | Gorlin et al. |
| 11,209,489 B2 | 12/2021 | Takahashi |

(Continued)

FOREIGN PATENT DOCUMENTS

WO    2021186512 A1    9/2021

OTHER PUBLICATIONS

Extended European Search Report in corresponding European Application No. 22198389.3 dated Apr. 12, 2023 (7 pages).

(Continued)

*Primary Examiner* — Jas A Sanghera
(74) *Attorney, Agent, or Firm* — Jeffri A. Kaminski; Venable LLP

(57) ABSTRACT

A method of determining ageing of a mixed electrode of a full cell lithium ion battery is presented. The method includes obtaining a voltage hysteresis of the full cell lithium ion battery by comparison of a charging voltage to a discharging voltage at a specific state of charge, SOC. The specific SOC is in a range from 0% to 20% of a maximum SOC. The method further includes determining ageing of a volume expanding component of the mixed electrode based on the obtained voltage hysteresis.

14 Claims, 4 Drawing Sheets

(56) References Cited

U.S. PATENT DOCUMENTS

2018/0313906 A1* 11/2018 Takahashi .......... G01R 31/3842
2019/0181510 A1    6/2019 Takahashi
2021/0141028 A1    5/2021 Du et al.
2021/0167426 A1    6/2021 Subbaraman et al.

OTHER PUBLICATIONS

Kuntz, P.; Raccurt, O.; Azaïs, P.; Richter, K.; Waldmann, T.; Wohlfahrt-Mehrens, M.; Bardet, M.; Buzlukov, A.; Genies, S.; "Identification of Degradation Mechanisms by Post-Mortem Analysis for High Power and High Energy Commercial Li-Ion Cells after Electric Vehicle Aging"; Batteries 2021, 7, 48. https://doi.org/10.3390/batteries7030048; 18 pages.

* cited by examiner

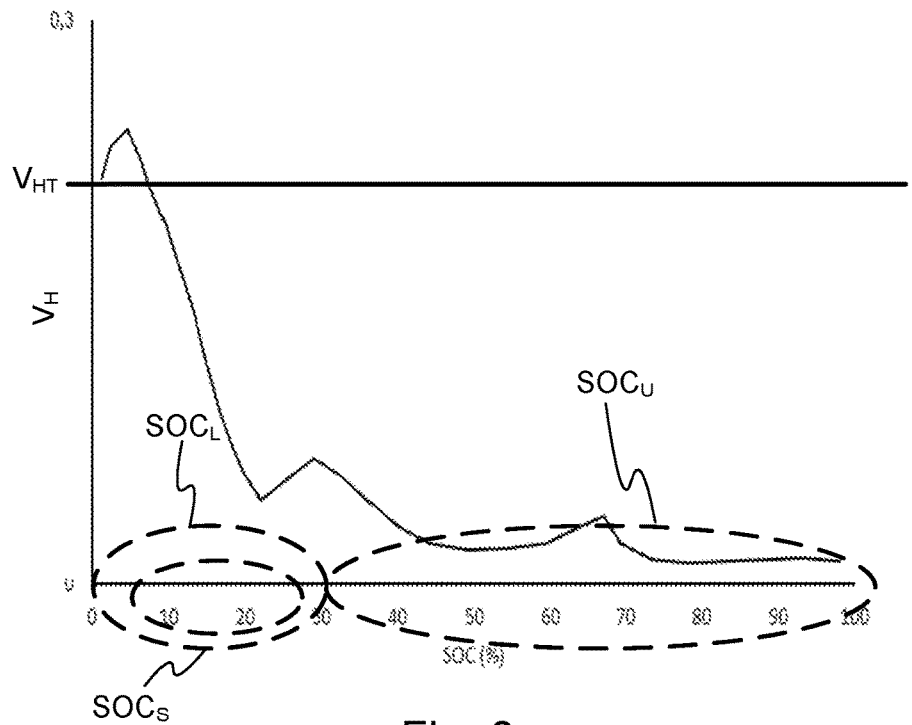
Fig. 6
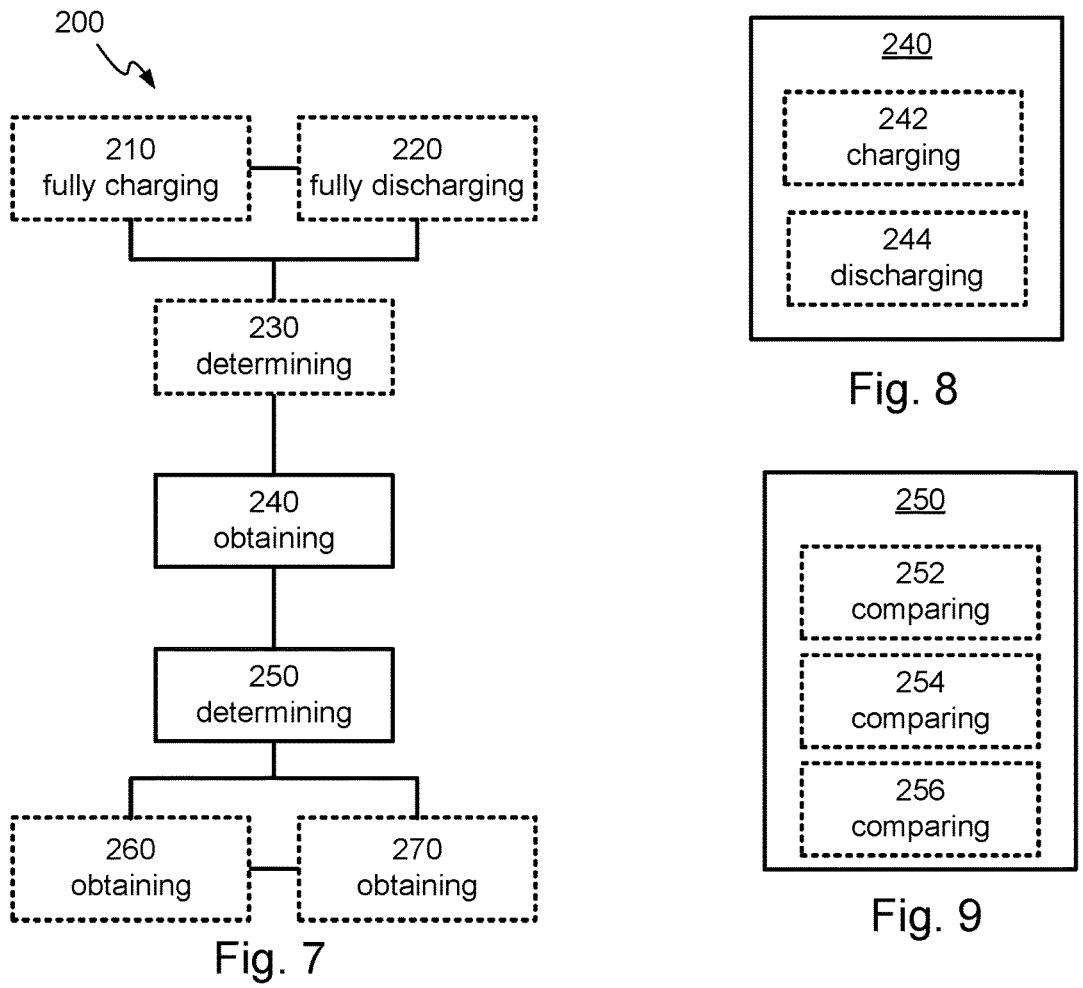
Fig. 7
Fig. 8
Fig. 9

METHOD FOR AGEING ANALYSIS OF MIXED ELECTRODE LITHIUM ION CELL

TECHNICAL FIELD

The present invention relates to non-invasive ageing analysis batteries, and more precisely to non-invasive analysis of full cell analysis of mixed electrode lithium ion batteries to identify loss of components of a mixed electrode.

BACKGROUND

Battery powered vehicles have been available for some time and lots of time and effort have been spent in developing and improving battery and battery charging technology. This has provided batteries with significantly higher capacity and extremely fast charging compared to what was available just a few years ago.

However, regardless of how high the capacity, or how fast the charging, batteries generally, at least to some degree, deteriorate (e.g. loose capacity) each time they are run though a charging cycle. The reasons for the reduction of capacity may vary depending on e.g. technology of the battery cell, charging behavior etc.

In order to determine the reason for a loss in capacity of a battery, half-cell data of the battery is generally required. Obtaining half-cell data is an invasive method and will typically destroy the battery.

SUMMARY

It is in view of the above considerations and others that the various embodiments of this disclosure have been made. The present disclosure therefor recognizes the fact that there is a need for alternatives to (e.g. improvement of) the existing art described above. It is an object of some embodiments to solve, mitigate, alleviate, or eliminate at least some of the above or other disadvantages.

An object of the present disclosure is to provide a new type of method of determining ageing of a battery which is improved over prior art and which eliminates or at least mitigates the drawbacks discussed above. More specifically, an object of the invention is to provide a non-invasive method of determining loss of a component in mixed electrode of a full cell battery. These objects are achieved by the technique set forth in the appended independent claims with preferred embodiments defined in the dependent claims related thereto.

In a first aspect a method of determining ageing of a mixed electrode of a full cell lithium ion battery is presented. The method comprises obtaining a voltage hysteresis of the full cell lithium ion battery by comparison of a charging voltage to a discharging voltage at a specific state of charge (SOC). The specific SOC is in a range from 0% to 20% of a maximum SOC. The method further comprises determining ageing of a volume expanding component of the mixed electrode based on the obtained voltage hysteresis.

In one variant, obtaining a voltage hysteresis of the full cell lithium ion battery comprises charging the full cell lithium ion battery from a lower SOC region to an upper SOC region, and for the specific SOC, obtaining the charging voltage. Further to this, the method comprises discharging the full cell lithium ion battery from the upper SOC region to the lower SOC region, and for the specific SOC, obtaining the discharging voltage. This is beneficial as it provides a repeatable and accurate method of obtaining the voltage hysteresis at the specific SOC.

In one variant, the volume expanding component of the mixed electrode is silicon. Silicon has high volume expansion during a charge cycle and is especially suitable for the present method.

In one variant, the method further comprises, before obtaining a voltage hysteresis of the full cell lithium ion battery, fully charging the full cell lithium ion battery from a minimum SOC to the maximum SOC, and determining a current capacity of the full cell lithium ion battery based on energy provided to the full cell lithium ion battery during the fully charging. This is beneficial as the current capacity may be determined.

In one variant, the method further comprises, before obtaining a voltage hysteresis of the full cell lithium ion battery, fully discharging the full cell lithium ion battery from the maximum SOC to the minimum SOC, and determining a current capacity of the full cell lithium ion battery based on energy obtained from the full cell lithium ion battery during the fully discharging. This is beneficial as the current capacity may be determined.

In one variant, the lower SOC region is a region from and including 0% to and including 10% of the maximum SOC of the full cell lithium ion battery.

In one variant, the lower SOC region is a region from and including 0% to and including 5% of the maximum SOC of the full cell lithium ion battery.

In one variant, the lower SOC region is a region from and including 0% to and including 3% of the maximum SOC of the full cell lithium ion battery.

In one variant, the upper SOC region is a region from and including 20% to and including 100% of the maximum SOC of the full cell lithium ion battery.

In one variant, the upper SOC region is a region from and including 50% to and including 100% of the maximum SOC of the full cell lithium ion battery.

In one variant, the upper SOC region is a region from and including 80% to and including 100% of the maximum SOC of the full cell lithium ion battery.

In one variant, the charging of the full cell lithium ion battery is performed prior to the discharging of the full cell lithium ion battery.

In one variant, the method further comprises obtaining a voltage hysteresis for the specific SOC from a substantially uncycled full cell lithium ion battery comprising a substantially identical mixed electrode as the full cell lithium ion battery. Further to this, determining ageing of the volume expanding component comprises comparing the obtained voltage hysteresis of the full cell lithium ion battery to the obtained voltage hysteresis of substantially uncycled full cell lithium ion battery. This is beneficial as it will give a percentage of loss of the volume expanding component compared to the new, e.g. substantially uncycled full cell lithium ion battery.

In one variant, determining ageing of the volume expanding component comprises comparing the determined voltage hysteresis to a voltage hysteresis threshold. This is beneficial as it is a quick and easy way to determine ageing.

In one variant, the voltage hysteresis threshold is below 0.2 V.

In one variant, the voltage hysteresis threshold is below 0.15 V.

In one variant, the voltage hysteresis threshold is below 0.1 V.

In one variant, the method further comprises obtaining a voltage hysteresis for the specific SOC from a half cell lithium ion battery comprising a substantially identical mixed electrode as the full cell lithium ion battery. Further to this, determining ageing of the volume expanding component comprises comparing the obtained voltage hysteresis of the full cell lithium ion battery to the obtained voltage hysteresis of the half-cell lithium ion battery. This is beneficial as it may provide an absolute measure of the loss of the volume expanding component.

In one variant, a charging current provided to the full cell lithium ion battery during the charging of the full cell lithium ion battery is determined as a ratio between an initial capacity of the full cell lithium ion battery and a charging time.

In one variant, the ratio between an initial capacity of the full cell lithium ion battery and the charging time is preferably below 2.5%. This is beneficial as it increases the effect of the loss of the volume expanding component, i.e. the hysteresis is increased.

In one variant, the ratio between an initial capacity of the full cell lithium ion battery and the charging time is preferably below 1%. This is beneficial as it increases the effect of the loss of the volume expanding component, i.e. the hysteresis is increased.

In one variant, a discharging current from to the full cell lithium ion battery during the discharging of the full cell lithium ion battery is determined as a ratio between the initial capacity of the full cell lithium ion battery and a discharging time.

In one variant, the ratio between the initial capacity of the full cell lithium ion battery and the discharging time is below 5%. This is beneficial as it increases the effect of the loss of the volume expanding component, i.e. the hysteresis is increased.

In one variant, the ratio between the initial capacity of the full cell lithium ion battery and the discharging time is below 2.5%. This is beneficial as it increases the effect of the loss of the volume expanding component, i.e. the hysteresis is increased.

In one variant, the ratio between the initial capacity of the full cell lithium ion battery and the discharging time is below 1%. This is beneficial as it increases the effect of the loss of the volume expanding component, i.e. the hysteresis is increased.

In one variant, the mixed electrode is an anode comprising silicon and graphite.

In a second aspect, a vehicle, comprising a processor circuit and a full cell lithium ion battery having a mixed electrode is presented. The processor circuit is operatively connected to the full cell lithium ion battery and configured to determine ageing of the battery cell by causing the execution of the method according to any of the preceding claims.

In one variant, the processor circuit is further configured to obtain an initial voltage hysteresis for the specific SOC during an early charge cycle of the full cell lithium ion battery and determining ageing of the volume expanding component of the mixed electrode based on comparing the obtained voltage hysteresis to the initial voltage hysteresis.

In one variant, the early charge cycle is one of the first 1-20 charge cycles.

In one variant, the early charge cycle is one of the first 1-10 charge cycles.

In one variant, the early charge cycle is one of the first 1-5 charge cycles.

BRIEF DESCRIPTION OF THE DRAWINGS

These and other aspects, features and advantages will be apparent and elucidated from the following description of various embodiments; references being made to the appended diagrammatical drawings which illustrate non-limiting examples of how the concept can be reduced into practice.

FIG. 6 is a graph showing voltage hysteresis obtained according to some embodiments of the present disclosure;

FIG. 7 is a block diagram of a method for determining ageing of a battery cell according to some embodiments of the present disclosure;

FIG. 8 is a block diagram of obtaining data for the method for determining ageing of a battery cell according to some embodiments of the present disclosure;

FIG. 9 is a block diagram of determining data for the method for determining ageing of a battery cell according to some embodiments of the present disclosure.

DETAILED DESCRIPTION OF EMBODIMENTS

Hereinafter, certain embodiments will be described more fully with reference to the accompanying drawings. The invention described throughout this disclosure may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

The term "coupled" is defined as connected, although not necessarily directly, and not necessarily mechanically. Two or more items that are "coupled" may be integral with each other. The terms "a" and "an" are defined as one or more unless this disclosure explicitly requires otherwise. The terms "substantially", "approximately", and "about" are defined as largely, but not necessarily wholly what is specified, as understood by a person of ordinary skill in the art. The terms "comprise" (and any form thereof, such as "comprises" and "comprising"), "have" (and any form thereof, such as "has" and "having"), "include" (and any form thereof, such as "includes" and "including") and "contain" (and any form thereof, such as "contains" and "containing") are open-ended linking verbs. As a result, a method that "comprises", "has", "includes" or "contains" one or more steps possesses those one or more steps, but is not limited to possessing only those one or more steps.

Figure 1A:
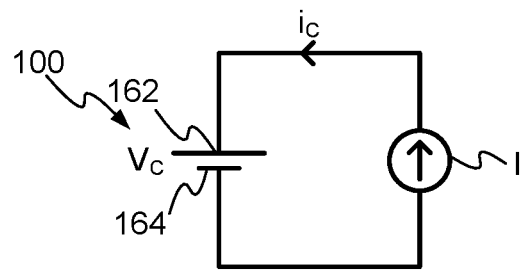
FIGS. 1a-b are schematics of a charging circuit and a discharging circuit as referenced in the present disclosure.
Figure 1B:
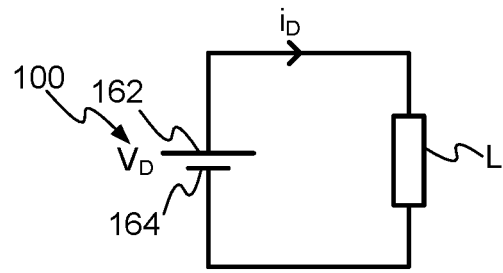

With reference to FIGS. 1a and 1b, some exemplifying circuit schematics will be used to explain some definitions adhered to in the present disclosure. In FIG. 1a, a schematic of a charging circuit is shown. When charging a battery cell 100, a charge current $i_c$ is injected into the battery cell from a positive voltage terminal 162 to a negative voltage terminal 164 of the battery cell 100. As a result, a cell charge voltage $V_C$ may be obtained across voltage terminals 162, 164. The charge current is may be provided by any suitable current source I. The current source I may be formed of any suitable electric circuit, and the electric circuit may be any circuit that may be modelled as a Thevenin or Norton equivalent with a suitable voltage or current source. In FIG. 1b, a schematic discharging circuit is shown. When discharging the battery cell 100, a load L is applied across the voltage terminals 162, 164 of the battery cell 100 such that a discharge current $i_D$ is drained from the battery cell 100 into the load L. When discharging the battery cell 100, a cell discharge voltage $V_D$ may be obtained across the voltage terminals 162, 164. The load L may be provided by any suitable circuitry or component. The load L may further be formed of any suitable electric circuit, and the electric circuit may be an active circuit that may be modelled as a Thevenin or Norton equivalent with a suitable voltage or current source.

Generally, to cycle a battery cell 100 means that is fully discharged and then fully charged. In some embodiments, the opposite definition may apply, wherein to cycle a battery cell 100 means that it is fully charged and then fully discharged.

The charge current $i_c$ is generally specified in relation to a capacity C of the battery cell 100 to be charged. Or rather, an initial capacity $C_i$ of the battery cell 100 to be charged. The initial capacity $C_i$ may be described as the capacity C the battery cell 100 is expected to deliver when new, i.e. the capacity of a substantially uncycled battery cell 100. The capacity C is generally specified in ampere hours Ah and by putting this in relation to an estimated charging time $T_c$ in hours h, the charge current $i_c$ is commonly described as $i_c=C_i/T_c$. Similarly, the charge current $i_d$ may be specified in relation to the initial capacity $C_i$ of the battery cell 100 to be discharged. The discharge current $i_d$ may be specified by putting the initial capacity $C_i$ of the battery cell 100 in relation to an estimated discharging time $T_d$ in hours h, the discharge current $i_d$ is commonly described as $i_d=C_i/T_d$.

Figure 2:
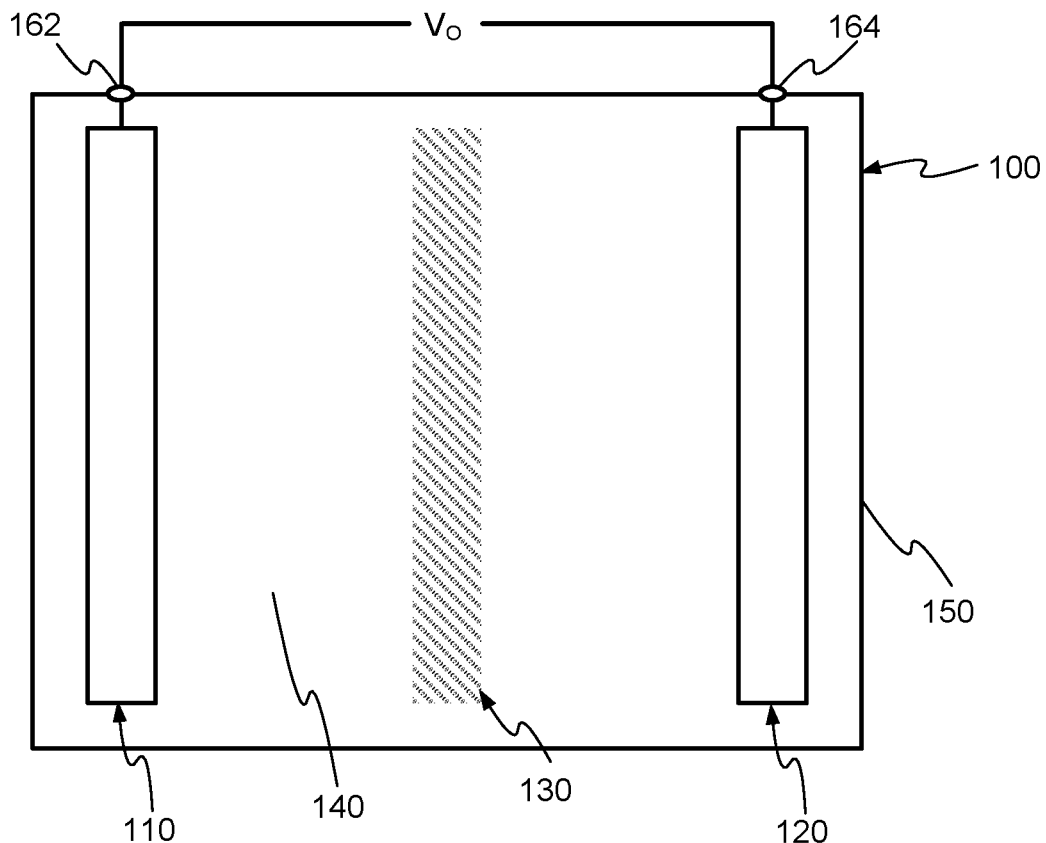
FIG. 2 is a battery cell according to some embodiments of the present disclosure.

In FIG. 2, a schematic cross-sectional view of a battery cell 100 is shown. The battery cell 100 as referenced herein is a lithium ion battery cell 100 and comprises a pair of electrodes 110, 120, configured as one anode 110 and one cathode 120. The electrodes 110, 120 are arranged inside a housing 150 sealing the battery cell 100. The electrodes 110, 120 are spaced apart and separated by an electrolyte 140, or electrolyte salt 140. The electrolyte is a non-aqueous electrolyte 140 comprising complexes of lithium ions, in some embodiments, the electrolyte is lithium hexafluorophosphate (LiPF$_6$). When charging or discharging the battery cell 100, lithium ions (Li$^+$) will move in the electrolyte 140 between the electrodes 110, 120 and through a separator 130, or separator diaphragm 130, arranged between the electrodes 110, 120. The anode 110 is connected to the positive voltage terminal 162 of the battery cell 100, and the cathode 120 is connected to the negative voltage terminal 164 of the battery cell 100. If no source I or load L is provided across the voltage terminals 162, 164, a cell open voltage $V_O$ may be obtained between the voltage terminals 162, 164. When the battery cell 100 is charged (see FIG. 1a), lithium ions will move within the battery cell 100 from the cathode 120 to the anode 110, increasing an amount of (positive) lithium ions at the anode 110 and decreasing an amount of (positive) lithium ions at the cathode 120. This may be referred to as lithiating (intercalation of lithium) the anode and delithiating (deintercalation of lithium) the cathode. This will increase the cell open voltage $V_O$. Correspondingly, when the battery cell 100 is discharged (see FIG. 1b), lithium ions will move within the battery cell 100 from the anode 110 to the cathode 120, decreasing the amount of (positive) lithium ions at the anode 110 and increasing the amount of (positive) lithium ions at the cathode 120. This may be referred to as delithiating the anode and lithiating the cathode. This will decrease the cell open voltage $V_O$. The battery cell 100 is generally described as fully charged when the cell open voltage $V_O$ has increased and reached a specific upper level. Correspondingly, the battery cell 100 is generally described as fully discharged when the cell open voltage $V_O$ has decreased and reached a specific lower level. The specific upper level and the specific lower level will be explained elsewhere in reference to charging and discharging.

During the first lithiation cycle of the electrodes 110, 120 a protective insulating layer will form on their respective surfaces. The protective layer may be referred to as a solid electrolyte interphase (SEI). The SEI is an irreversibly formed surface layer comprised of compounds from the electrolyte 140. The SEI is, in other words, formed at surface areas of the electrodes 110, 120 when they are first exposed to the electrolyte 140. The formation of the SEI will cause a loss in capacity at the electrode 110, 120 due to e.g. lithium redox reactions, i.e. the formation of the SEI consumes lithium ions.

Historically, electrodes of battery cells have been based on graphite. However, graphite may experience significant irreversible loss due to large surface areas required to hold lithium ions. This will consume available lithium ions, and therefore reduce an energy density of the battery cell. In order to increase the energy density, i.e. the amount of energy a battery cell 100 of a given volume may store and later release, the materials of the electrodes 110, 120 may be changed. Silicon (Si) is one material having high capacity and low working potential. Silicon is commonly mixed with graphite to provide a mixed electrode 110, 120. This is most common for the anode 110, but similar embodiments may be envisioned also for the cathode 120.

One issue with silicon is that it will change in volume when depending on a state of charge of the battery cell 100, and as the volume expands, a surface area of the electrode 110, 120 will increase. The increase of surface area will expose more area of the electrode to the electrolyte 140 and the SEI will increase causing increased loss in capacity. As the electrode 110, 120 is delithiated, its volume decreases. Repeated lithiation and delithiation of the electrode 110, 120 will cause it to increase and decrease in volume which may cause the SEI to break, exposing more of the surface area of the electrode 110, 120 to the electrolyte. At these newly exposed surface areas, more SEI will be formed consuming further lithium ions causing even further decrease in capacity C. Formation of SEI will, in addition to consume lithium ions, also consume active components of the electrodes 110, 120. The repeated volume expansion and contraction put the volume expanding component of the electrode 110, 120 under stress. This generally leads to isolation and breakage of particles of the volume expanding component rendering them electrochemically inactive.

The above mentioned SEI is one reason for the capacity of a battery cell 100 being reduced. The capacity C of the battery cell is determined by the complex chemistry involving e.g. the electrolyte 140 and the electrodes 110, 120. Based on the components of the battery sell 100 causing the battery cell 100 to lose capacity, many facts regarding how the battery cell 100 has been used may be deduced. Further to this, knowing the reason for a capacity loss will increase the accuracy in estimating and modelling future behavior of the battery cell, i.e. remaining capacity C at a particular cell open voltage $V_O$. It is also beneficial in predicting a remaining lifetime of a battery cell 100. Historically, obtaining such data required invasive method in order to obtain half-cell data. For instance, in order to track the loss of silicon in a mixed electrode 110, 120, differential voltage analysis (DVA) and incremental capacity analysis (ICA) may be employed, but both these methods require half-cell data in order to identify the peaks due to different components of the electrode materials. The present disclosure teaches of a method of tracking loss of silicon or another volume expanding components in a mixed electrode without the need for half-cell data.

Figure 3A:
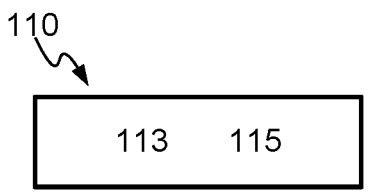
FIGS. 3a-b are block diagrams of mixed electrodes according to some embodiments of the present disclosure.
Figure 3B:
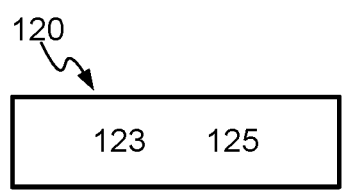

In FIG. 3a a schematic view of a mixed anode 110 is shown and in FIG. 3b a corresponding view of a mixed cathode 120 is shown. A mixed electrode 110, 120 is an electrode comprising more than one active component 113, 115, 123, 125. Preferably the mixed electrode comprises two active components 115, 125. The components 115, 125 are generally volume expanding components 115, 125. The volume expansion of the components 115, 125 is generally different, and a preferred mixed electrode 110, 120 comprises silicon 115 and graphite. The silicon component 115 generally expand more than 400% from being fully delithiated to being fully lithiated. Correspondingly, the graphite component 113 generally expand about 10-20%. The volume expansion is comparing a volume of the component 113, 115 at a discharged state of the battery cell 100 to the volume of the component 113, 115 at the charged state. In one embodiment, a volume expanding component 113 is a component 113 that has a volume expansion of more than 50%, preferably more than 100% and most preferably more than 250%.

Figure 4:
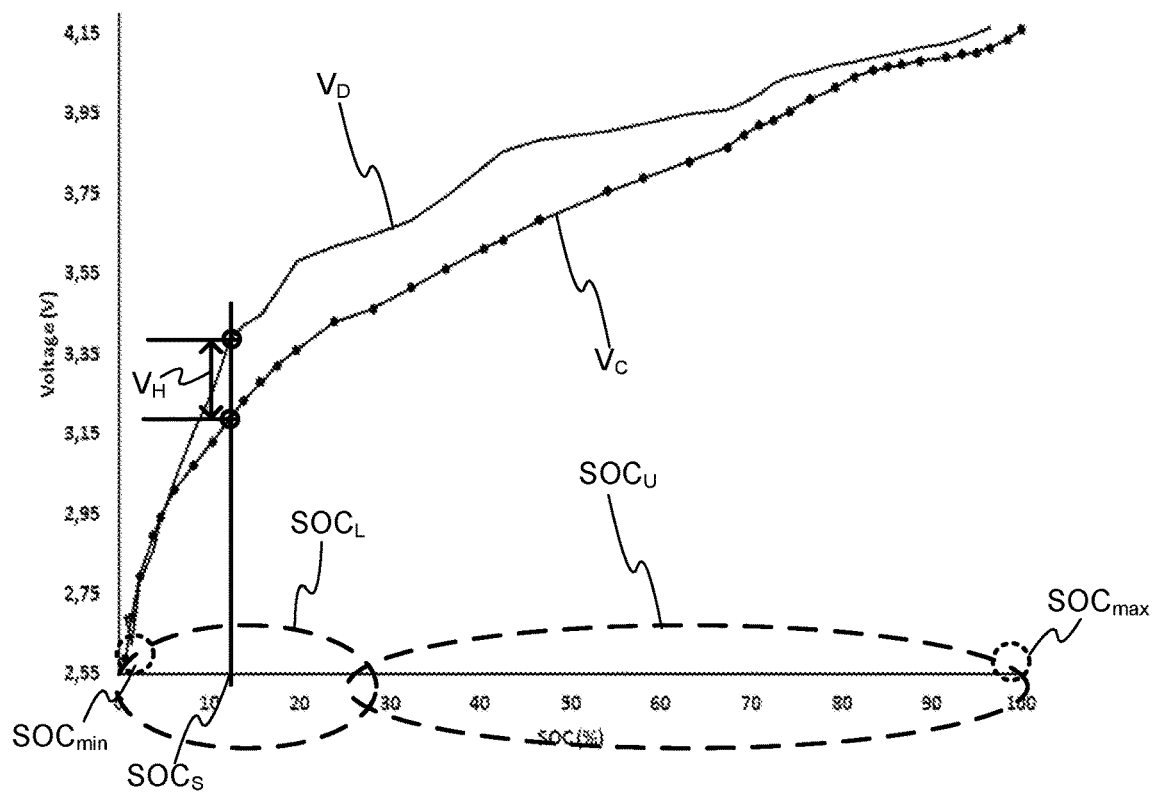
FIG. 4 is a graph showing voltage versus state of charge obtained according to some embodiments of the present disclosure.

In FIG. 4, a graph showing discharge voltage $V_D$ and charge voltage $V_C$ versus a state of charge (SOC) for a battery cell 100 having a mixed electrode 110, 120. It should be mentioned that unless clearly stated otherwise, all references to a battery cell in the following are to a full cell battery 100, i.e. a battery cell 100 that has not been opened. The specific data in FIG. 4 is from a battery cell 100 comprising a mixed anode 110 comprising graphite and silicon. The SOC define a current charge of the battery cell 100 in relation to a maximum SOC $SOC_{max}$. A fully charged battery cell 100 will have an SOC of 100% and a fully discharged battery cell 100 will have a SOC of 0%. That is to say, the maximum SOC $SOC_{max}$ is 100% and a minimum SOC $SOC_{max}$ is 0%. The maximum $SOC_{max}$ may be described as the SOC at which the charging voltage $V_C$ of the full cell battery 100 is substantially unaffected by further charging, i.e. as the charging continues, the charging voltage $V_C$ does not change. At the maximum $SOC_{max}$, the charging voltage $V_C$ is, in one embodiment, at 4.2 V. Correspondingly, the minimum $SOC_{min}$ may be described as the SOC at which the discharging voltage $V_D$ of the full cell battery 100 is substantially unaffected by further discharging, i.e. as the discharging continues, the charging voltage $V_D$ does not change. At the minimum $SOC_{min}$, the discharging voltage $V_D$ is, in one embodiment, at 2.7 V As seen in FIG. 4, the discharge voltage $V_D$ and the charge voltage $V_C$ are not aligned and a hysteresis voltage $V_H$ may be observed between the discharge voltage $V_D$ and the charge voltage $V_C$. The hysteresis voltage $V_H$ is generally not constant across the SOC. As seen in FIG. 4, the SOC may be divided into a lower SOC region $SOC_L$, and an upper SOC region $SOC_U$. The lower SOC region $SOC_L$ and the upper SOC region $SOC_U$ are not required to when combined comprise the whole range of the SOC, i.e. 0-100%. In one embodiment, the lower SOC region $SOC_L$ is a region from and including 0% to and including 10%. In a preferred embodiment, the lower SOC region $SOC_L$ is a region from and including 0% to and including 5%. In a most preferred embodiment, the lower SOC region $SOC_L$ is a region from and including 0% to and including 3%. In one embodiment, the upper SOC region $SOC_U$ is a region from and including 20% to and including 100%. In a preferred embodiment, the upper SOC region $SOC_U$ is a region from and including 50% to and including 100%. In a most preferred embodiment, the upper SOC region $SOC_U$ is a region from and including 80% to and including 100%. The hysteresis voltage $V_H$ observed at the lower SOC region $SOC_L$ is due to the volume expanding properties of the mixed electrode 110, 120.

Figure 5:
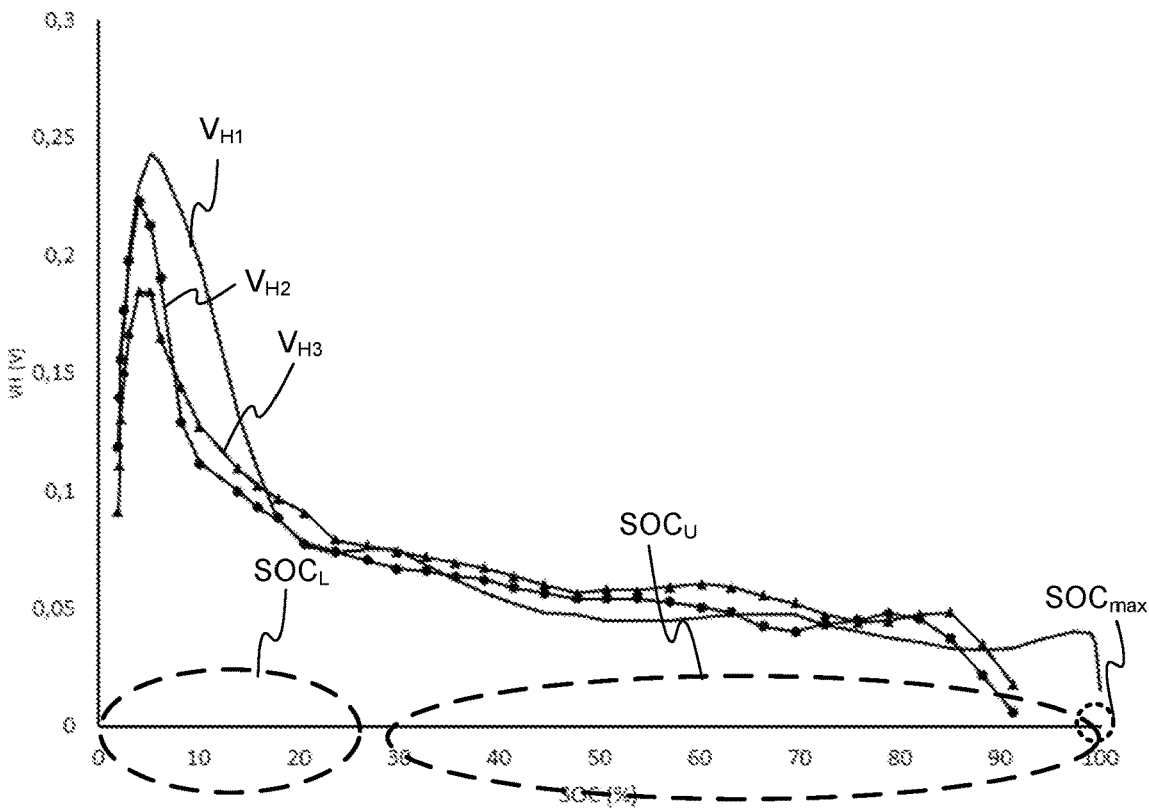
FIG. 5 is a graph showing voltage hysteresis obtained according to some embodiments of the present disclosure.

The inventors behind the present disclosure have discovered that the hysteresis voltage $V_H$ will differ between a new battery cell 100 and a battery cell 100 that has been cycled a number of times. This is shown in FIG. 5, wherein three hysteresis voltages $V_{H1}$, $V_{H2}$, $V_{H3}$ are shown. In FIG. 5, a first hysteresis voltage $V_{H1}$, solid black line, is the hysteresis voltage $V_H$ of a new battery cell 100, a second hysteresis voltage $V_{H2}$, dotted black line, shows the hysteresis voltage $V_H$ of a battery cell 100 after a first plurality of cycles and a third hysteresis voltage $V_{H3}$, triangled black line, is the hysteresis voltage $V_H$ of a battery cell 100 after a second plurality of cycles. The second plurality of cycles are greater than the first plurality of cycles. Specifically for the data in FIG. 5, the first plurality of cycles is 450 cycles and the second plurality of cycles is 900 cycles. It may be observed from FIG. 5 that the hysteresis voltage $V_H$ is decreased with increasing cycles at the lower SOC $SOC_L$ and substantially unchanged at the upper $SOC_U$. It may be noted that the second hysteresis voltage $V_{H2}$ and the third hysteresis voltage $V_{H3}$ don't reach the maximum SOC $SOC_{max}$, this is simply because the maximum SOC $SOC_{max}$ is defined from a new battery cell 100 and based on the initial capacity $C_i$ of the battery cell 100. As explained, the cycling a battery cell 100 will reduce its capacity C.

The reduction in hysteresis voltage $V_H$ at the low SOC $SOC_L$ is an indication of a loss of the volume expanding component 115, 125 of the mixed electrode 110, 120. The loss of the volume expanding component 115, 125 causes a reduced change in volume during cycling; therefore the hysteresis voltage $V_H$ is reduced at comparably low SOC. In FIG. 5 specifically, the reduction in hysteresis voltage $V_H$ is due to a loss of silicon 115 from a mixed silicon-graphite anode 110.

The inventors have further concluded that the effect of the hysteresis is more visible at lower charging currents is and discharging currents $i_d$. It has been shown that the effect is significantly increased at charging currents below $C_i/40$, i.e. a ratio of 2.5% (the charging time $T_c$ is 40). The effect is even more significant at charging currents below $C_i/100$, i.e. a ratio of 1% (the charging time $T_c$ is 100). Similarly, the effect is increased at discharging currents below $C_i/20$ i.e. a ratio of 5% (the discharging time $T_d$ is 20). The effect is further increased at discharging currents below $C_i/40$ i.e. a ratio of 2.5% (the discharging time $T_d$ is 40). The effect is even further increased at discharging currents below $C_i/100$ i.e. a ratio of 1% (the discharging time $T_d$ is 100).

In FIG. 6, an exemplary voltage hysteresis $V_H$ of a battery cell 100 is shown. The voltage hysteresis $V_H$ may be determined by charging and discharging the battery cell 100 to obtain data for discharging voltages $V_D$ and charging voltages $V_C$ at one or more SOCs. As shown in FIG. 5, the difference in voltage hysteresis $V_H$ is largest at the lower SOC region $SOC_L$ and it may be sufficient to obtain a voltage hysteresis $V_H$ at one specific SOCs, see also FIG. 4. The specific SOCs is preferably within the lower SOC region $SOC_L$. Consequently, it is sufficient to obtain one charging voltage $V_C$ and one discharging voltage $V_D$, both associated with the specific SOC SOCs. Based on the voltage hysteresis $V_H$ at the specific SOCs, ageing of the battery cell 100 may be determined.

Ageing, i.e. loss of the active component 115, 125 of an electrode 110, 120 of the battery cell 100 may be determined in a number of different ways based on the voltage hysteresis $V_H$ at the specific SOCs. In one embodiment, ageing of a specific battery cell 100 may be determined by comparing the obtained voltage hysteresis $V_H$ at the specific SOCs, to a voltage hysteresis $V_H$ at the specific SOCs for a new battery cell 100 of a same model, or at least of a model having similar specification, as the specific battery cell 100. This is beneficial as the change in voltage hysteresis $V_H$ is proportional to the loss of the volume expanding component 115, 125 and a loss of the volume expanding component 115, 125 may be determined as a percentage loss of an initial amount of the volume expanding component 115, 125.

Alternatively, or additionally, the ageing may be determined by comparing the voltage hysteresis $V_H$ at the specific SOCs to a voltage hysteresis threshold $V_{HT}$. If the voltage hysteresis $V_H$ at the specific SOCs to below the voltage hysteresis threshold $V_{HT}$, the battery cell 100 may be determined to be aged. If the voltage hysteresis $V_H$ at the specific SOCs to above the voltage hysteresis threshold $V_{HT}$, the battery cell 100 may be determined as not being aged.

In one embodiment, the voltage hysteresis threshold $V_{HT}$ may be set at 0.2 V. In another embodiment, the voltage hysteresis threshold $V_{HT}$ may be set at 0.15 V. In yet another embodiment, the voltage hysteresis threshold $V_{HT}$ may be set at 0.1 V.

This implementation of a voltage hysteresis threshold $V_{HT}$ is a rather digital approach and may be usable to determine if e.g. the battery cell 100 should be replaced or not. However, in some embodiments, a plurality of voltage hysteresis threshold $V_{HT}$ may be provided at different voltage hysteresis $V_H$ at the specific SOC SOCs. An upper voltage hysteresis threshold $V_{HT}$ may be set to indicate a limit for when the battery cell is to be considered new. Another voltage hysteresis threshold $V_{HT}$ may be set to indicate that the battery cell 100 should be replaced. Other voltage hysteresis thresholds $V_{HT}$ may be provided in between these voltage hysteresis thresholds $V_{HT}$ to provide granularity in the determining of the ageing of the battery cell 100.

In some embodiments, the ageing of the specific battery cell 100 may be determined by comparing the voltage hysteresis $V_H$ at the specific SOC SOCs to a corresponding voltage hysteresis $V_H$ at the specific SOC obtained from half-cell data of a battery half-cell having substantially the same specification as the specific battery cell 100. The half-cell data may be obtained using e.g. the previously mentioned DVA and/or ICA.

Based on the teaching presented herein, a method 200 of determining ageing of a mixed electrode 110, 120 as shown in FIG. 7 will be described. As the method 200 is a non-invasive method 200, it may be performed on a full cell battery 100, i.e. a battery cell 100 that has not been opened. The method 200 may be configured to comprise any suitable feature, example or embodiment presented herein. Preferably, the method 200 comprises obtaining 240 the voltage hysteresis $V_H$ at the specific SOC (SOCs. This may be performed in any way disclosed herein, and preferably by comparing the charging voltage $V_C$ at the specific SOC SOCs to the discharging voltage $V_D$ at the specific SOC SOCs. As seen in e.g. FIG. 5, the specific SOC SOCs is preferably in a range from 0% to 20% of the maximum SOC $SOC_{max}$. The method 200 preferably further comprises determining 250 ageing of the volume expanding component 115, 125 of the mixed electrode 110, 120 based on the obtained voltage hysteresis $V_D$.

As shown in FIG. 8, the method 200, or rather obtaining 240 the voltage hysteresis $V_H$, may optionally comprise charging 242 the full cell battery 100 from the lower SOC region $SOC_L$ to an upper SOC region $SOC_U$. For at least the specific SOC SOCs, obtaining the charging voltage $V_C$. Similarly, obtaining 240 the voltage hysteresis $V_H$, may optionally further comprise discharging 244 the full cell battery 100 from the upper SOC region $SOC_U$ to the lower SOC region $SOC_L$. For at least the specific SOC SOCs, obtaining the discharging voltage $V_D$. It should be mentioned that the discharging voltage $V_D$ and/or the charging voltage $V_C$ may very well be series of voltages $V_D$, $V_C$ such as shown by the graph in FIG. 4, and the voltages $V_D$, $V_C$ for the specific SOCs may be obtained from the series of voltages $V_D$, $V_C$. It should be mentioned that the charging 242 and the discharging 244 may be performed in any order. However, in a preferred embodiment, the charging 242 is performed prior to the discharging 244.

With continued reference to FIG. 7, in some embodiments, the method 200 may further comprise, preferably before obtaining 240 the voltage hysteresis $V_H$, fully charging 210 the full cell battery 100 from the minimum SOC $SOC_{min}$ to the maximum SOC $SOC_{max}$. Based on energy provided to the full cell battery 100 during the fully charging 210, a current capacity C of the full cell battery 100 may be determined 230. Additionally, or alternatively, in some embodiments, the method 200 may further comprise, preferably before obtaining 240 the voltage hysteresis $V_H$, fully discharging 220 the full cell battery 100 from the maximum SOC $SOC_{max}$ to the minimum SOC $SOC_{min}$. Based on energy drained from to the full cell battery 100 during the fully discharging 220, the current capacity C of the full cell battery 100 may be determined 230. It should be mentioned that the steps of fully charging 210 and fully discharging 220 are not mutually exclusive but may be combined in any order. Also, the determining 230 of the current capacity C may be based on data from either or both of the fully charging 210 and fully discharging 220. In cases where data from both the fully charging 210 and the fully discharging 220 are used, an average, or weighted average may be employed when determining 230 the current capacity C of the battery cell 100.

In some embodiments, the method may optionally comprise obtaining 260 a voltage hysteresis $V_H$ for the specific SOC SOCs from a substantially uncycled full cell battery 100. The uncycled full cell battery 100 may be a historic voltage hysteresis $V_H$ for the battery cell 100 for which ageing is determined obtained during one of the initial cycles of the battery cell 100. Alternatively, voltage hysteresis $V_H$ may be from any uncycled battery cell comprising a substantially identical mixed electrode 110, 120 as the full cell battery 100 under age determination. In such embodiments, the determining 250 ageing of the volume expanding component 115, 125 may optionally comprise comparing 252, see FIG. 9, the obtained voltage hysteresis $V_H$ of the full cell battery 100 to the obtained voltage hysteresis $V_H$ of the substantially uncycled full cell battery 100.

It should be mentioned that the battery cell 100 may be operatively connected to or comprise a memory that stores voltage hysteresis $V_H$ at the specific SOC SOCs for the first, or first group of cycles of the battery cell 100. This data may be stored onto the memory during manufacturing of the battery cell 100 or stored during the first use of the battery cell 100. If the battery cell 100 is used in an electric vehicle EV 300, see FIG. 10, the EV 300 may be configured to store voltage hysteresis $V_H$ at the specific SOC SOCs at the first, and/or any consecutive cycle of the battery cell 100.

As seen in FIG. 9, in some embodiments, determining 250 ageing of the volume expanding component 115, 125 comprises comparing 254 the determined voltage hysteresis $V_H$ to a voltage hysteresis threshold $V_{HT}$. This may be performed in any suitable manner as disclosed herein, e.g. in reference to FIG. 5.

Again in reference to FIG. 9, the method may optionally comprise obtaining 270 a voltage hysteresis $V_H$ for the specific SOC SOCs from a half cell battery comprising a substantially identical mixed electrode 110, 120 as the full cell battery 100. In such embodiments, see FIG. 9, determining 250 ageing of the volume expanding component 115, 125 may comprise comparing 256 the obtained voltage hysteresis $V_H$ of the full cell battery 100 to the obtained voltage hysteresis $V_H$ of the half cell battery.

Figure 10:
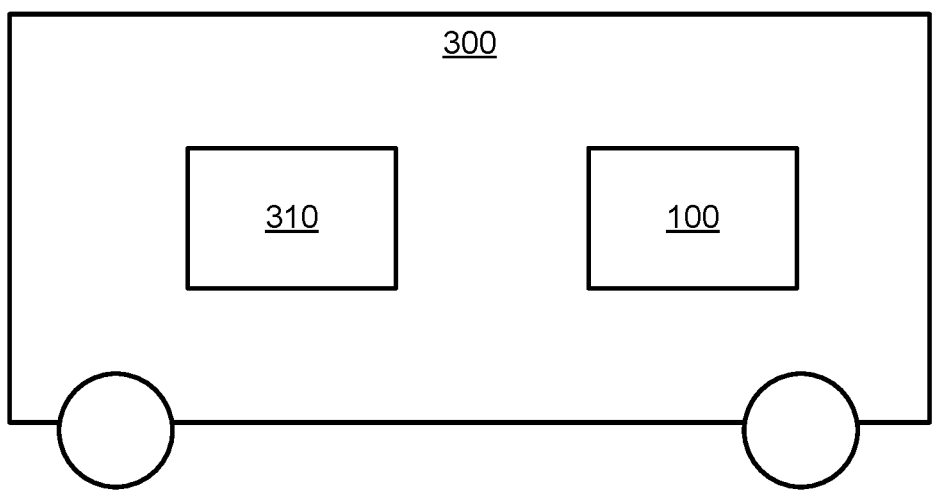
FIG. 10 is a side view of a vehicle according to embodiments of the present disclosure.

With reference to FIG. 10, a vehicle 300 according to the present disclosure will be presented. The vehicle 300 comprises a processor circuit 310 and a battery cell 100 that may be any battery cell 100 presented herein having a mixed electrode 115, 125. The processor circuit 310 is operatively connected to the battery cell 100 and may be configured to cause determining of ageing of the battery cell 100 in accordance with the method 200 as presented in reference to FIGS. 7-9. The processor circuit 310 may be configured to simply monitor a voltage of the battery cell 100 and thereby cause the obtaining of the voltage hysteresis $V_H$ for the specific SOC SOCs. The processor circuit 310 may further be configured to obtain an initial voltage hysteresis $V_H$ for the specific SOC SOCs in accordance with the teachings presented when describing the substantially uncycled battery cell 100. Specifically for the vehicle 300 (but applicable to any battery powered device), the processor circuit 310 mat be configured to obtain the initial voltage hysteresis $V_H$ for the specific SOC SOCs during an early charge cycle of the full cell battery 100. The early charge cycle is one of the first 1-20 charge cycles, preferably the early charge cycle is one of the first 1-10 charge cycles, and most preferably the early charge cycle is one of the first 1-5 charge cycles. The processor circuit 310 may be configured to store the initial voltage hysteresis $V_H$ for the specific SOC SOCs and compare subsequent voltage hysteresis's $V_H$ for the specific SOC SOCs to the initial voltage hysteresis $V_H$. This will allow the processor circuit 310 to accurately determine the ageing of the battery cell 100, also better model the voltage versus SOC for the battery cell 100 and determine an expected lifetime of the battery cell 100.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while embodiments of the invention have been described mainly with reference to a silicon and graphite anode, persons skilled in the art will appreciate that the embodiments of the invention can equivalently be applied to any combination of volume expanding components in an electrode, anode or cathode. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. Furthermore, although individual features may be included in different claims (or embodiments), these may possibly advantageously be combined, and the inclusion of different claims (or embodiments) does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method of determining ageing of a mixed electrode of a full cell lithium ion battery, the method comprising:
   obtaining a voltage hysteresis of the full cell lithium ion battery by comparison of a charging voltage to a discharging voltage at a specific state of charge, SOC, wherein the specific SOC is in a range from 0% to 20% of a maximum SOC, wherein the charging voltage is obtained at a charging current and the discharging voltage is obtained at a discharging current configured such that a ratio between an initial capacity of the full cell lithium ion battery and a charging time is below 5%; and
   determining ageing of a volume expanding component of the mixed electrode based on a comparison of the obtained voltage hysteresis and a voltage hysteresis at the specific SOC of a substantially uncycled corresponding full cell lithium ion battery.

2. The method of claim 1, wherein obtaining a voltage hysteresis of the full cell lithium ion battery comprises:
   charging the full cell lithium ion battery from a lower SOC region to an upper SOC region, and for the specific SOC, obtaining the charging voltage, and
   discharging the full cell lithium ion battery from the upper SOC region to the lower SOC region, and for the specific SOC, obtaining the discharging voltage.

3. The method of claim 2, wherein the lower SOC region is a region from and including 0% to and including 10% of the maximum SOC of the full cell lithium ion battery.

4. The method of claim 2, wherein the upper SOC region is a region from and including 20% to and including 100% of the maximum SOC of the full cell lithium ion battery.

5. The method of claim 2, wherein the charging of the full cell lithium ion battery is performed prior to the discharging of the full cell lithium ion battery.

6. The method of claim 1, wherein the volume expanding component of the mixed electrode is silicon.

7. The method of claim 1, further comprising, before obtaining a voltage hysteresis of the full cell lithium ion battery:
   fully charging the full cell lithium ion battery from a minimum SOC to the maximum SOC, and/or
   fully discharging the full cell lithium ion battery from the maximum SOC to the minimum SOC, and
   determining a current capacity of the full cell lithium ion battery based on energy provided to the full cell lithium ion battery during the fully charging and/or energy obtained from the full cell lithium ion battery during the fully discharging.

8. The method of claim 1, further comprising:
   obtaining a voltage hysteresis for the specific SOC from a substantially uncycled full cell lithium ion battery comprising a substantially identical mixed electrode as the full cell lithium ion battery,
   wherein determining ageing of the volume expanding component comprises comparing the obtained voltage hysteresis of the full cell lithium ion battery to the obtained voltage hysteresis of substantially uncycled full cell lithium ion battery.

9. The method of claim 1, wherein determining ageing of the volume expanding component comprises comparing the obtained voltage hysteresis to a voltage hysteresis threshold, wherein the voltage hysteresis threshold is below 0.2 V.

10. The method of claim 1, further comprising:
obtaining a voltage hysteresis for the specific SOC from a half cell battery comprising a substantially identical mixed electrode as the full cell lithium ion battery,
wherein determining ageing of the volume expanding component comprises comparing the obtained voltage hysteresis of the full cell lithium ion battery to the obtained voltage hysteresis of the half cell battery.

11. The method of claim 1, wherein the ratio between the initial capacity of the full cell lithium ion battery and the charging time, is below 1%.

12. The method of claim 1, wherein the mixed electrode is an anode comprising silicon and graphite.

13. A vehicle, comprising a processor circuit and a full cell lithium ion battery having a mixed electrode, wherein the processor circuit is operatively connected to the full cell lithium ion battery and configured to determine ageing of the battery cell by causing the execution of the method according to claim 1.

14. The vehicle of claim 13, wherein the processor circuit is further configured to obtain an initial voltage hysteresis for the specific SOC during an early charge cycle of the full cell lithium ion battery and determining ageing of the volume expanding component of the mixed electrode based on comparing the obtained voltage hysteresis to the initial voltage hysteresis, wherein the early charge cycle is one of the first 1-20 charge cycles.

* * * * *